United States Patent
Matsumoto

(10) Patent No.: US 7,639,408 B2
(45) Date of Patent: Dec. 29, 2009

(54) IMAGE FORMING DEVICE

(75) Inventor: Takayuki Matsumoto, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1000 days.

(21) Appl. No.: 11/002,255

(22) Filed: Dec. 3, 2004

(65) Prior Publication Data
US 2006/0119868 A1 Jun. 8, 2006

(51) Int. Cl.
H04N 1/04 (2006.01)
H04N 1/40 (2006.01)
H04N 1/393 (2006.01)

(52) U.S. Cl. .................. 358/474; 358/451; 358/401; 358/497; 358/496; 358/443; 358/444; 358/449; 358/412; 358/296; 382/298

(58) Field of Classification Search .......... 358/451, 358/449, 474, 497, 296, 505, 528, 525, 401, 358/444, 501, 412, 443, 496; 382/298, 299, 382/300; 399/211, 212
See application file for complete search history.

(56) References Cited

U.S. PATENT DOCUMENTS

| 4,647,188 A * | 3/1987 | Komiya et al. ............. 355/55 |
| 7,054,040 B2 * | 5/2006 | Shoda et al. ............. 358/474 |
| 7,301,681 B2 * | 11/2007 | Tabata et al. ............. 358/514 |

FOREIGN PATENT DOCUMENTS

| JP | 10312134 A | * 11/1998 |
| JP | 2001-077980 A | 3/2001 |
| JP | 2003-087522 A | 3/2003 |
| JP | 2003-087559 A | 3/2003 |

* cited by examiner

Primary Examiner—Cheukfan Lee
(74) Attorney, Agent, or Firm—Foley & Lardner LLP

(57) ABSTRACT

An image forming device includes a scanner, a first setting portion configured to set a reading scale factor for an image from a document, a second setting portion configured to set the size of an image formed medium, a determining portion configured to determine to which of divided ranges the reading scale factor set by the first setting portion belongs, a moving section configured to move the scanner at a specified moving speed corresponding to the range determined by the determining portion, a calculating section configured to calculate a distance the scanner moves based on the reading scale factor and the size of the image formed medium, and a storing portion configured to store the image read by a photoelectric converting device while the moving section is moving the scanner at the moving speed corresponding to the reading scale factor.

6 Claims, 5 Drawing Sheets

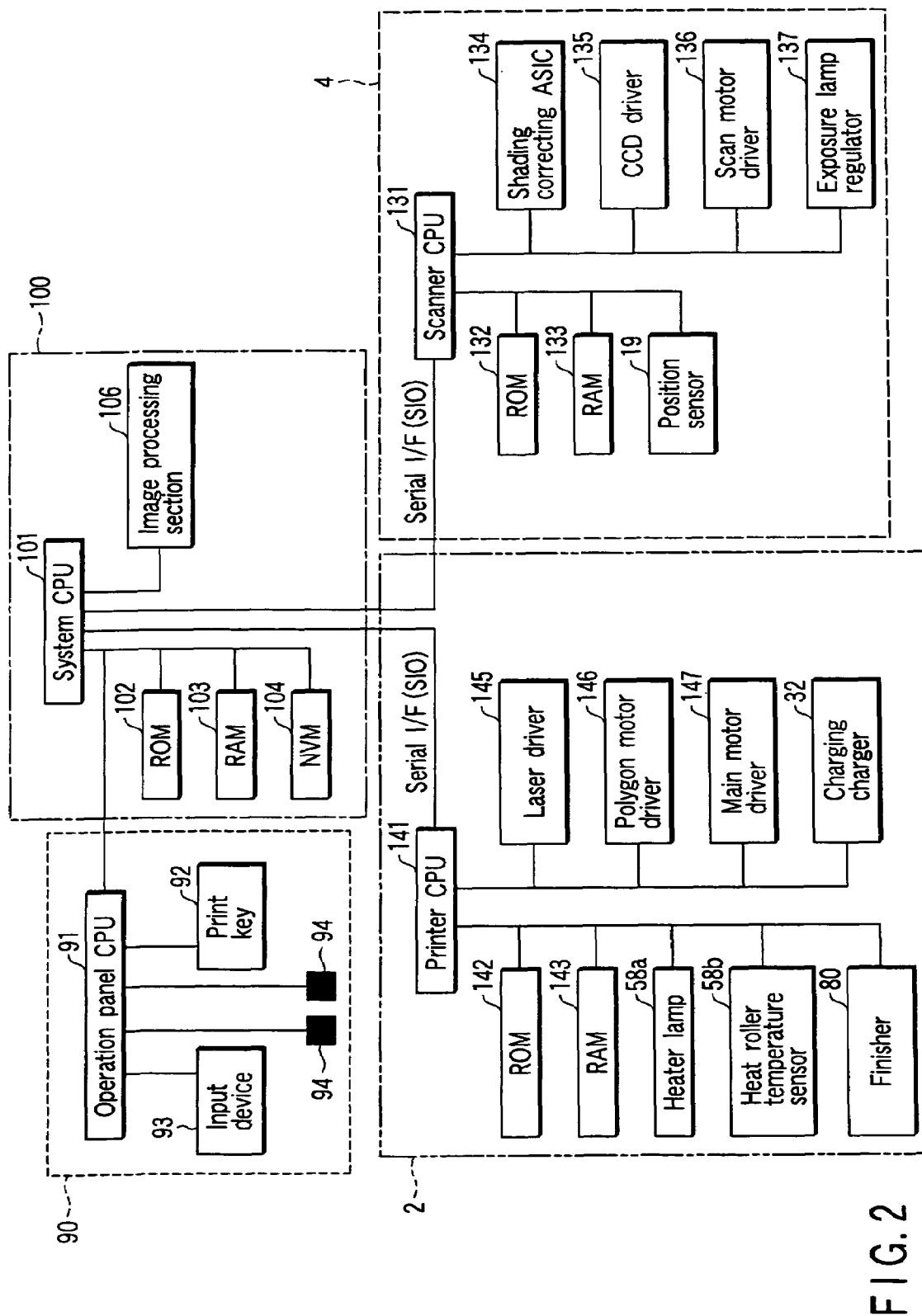
F I G. 2

IMAGE FORMING DEVICE

BACKGROUND OF THE INVENTION

The present invention relates to an image forming device such as a digital copier, a digital composite device, or a facsimile device which has a function for reading an image. More specifically, the present invention relates to zoom control performed by the image forming device to read an image from a document to form a scale factor changed image.

A conventional image forming device comprises image reading means for reading an image, image storage means for storing the image data read by the image reading means, image forming means for reading the image data stored in the image storage means and forming an image on a sheet on the basis of the image data, and setting means for setting an operator specified scale factor for the image on the document, the operator specified scale factor being a final image formation scale factor specified by the operator. The image forming device has zoom control that forms a scale factor changed image. Further, the image reading means for reading an image is composed of a first carriage on which a light source irradiating the document with light and a mirror reflecting reflected light from the document to a light receiving side are mounted, a second carriage on which a mirror reflecting the reflected light from the document to the light receiving side is mounted, a lens that forms an image, and photoelectric converting means (CCD) for converting the image into an electric signal. The photoelectric converting means (CCD) receives the reflected light for the image as line-like reflected light traveling in a main scanning direction. The photoelectric converting means then converts the reflected light into an electric signal. The photoelectric converting means may be called a CCD line sensor.

In this case, the first and second carriages are called a scanner. The first and second carriages are driven with wires. The second carriage moves at a speed half that of the first carriage. Further, the speed at which the first carriage of the scanner moves is defined as the speed at which the document is read (the moving speed of the first carriage will hereinafter be referred to as a scanner moving speed or reading speed).

A proposal has been made of the following technique. A conventional digital copier or digital composite device uses the image reading means to move a lens that forms an image in association with a reading scale factor of 100%, thus reading the image from the document. The 100% image data (hereinafter referred to as scale factor-equalized image data) is stored in an internal memory. The scale factor of the scale factor-equalized image data is changed in accordance with the operator specified scale factor. Then, a scale factor-changed image can be re-formed on the sheet (see, for example, Document 1 or Document 2).

However, this technique performs control that stores the scale factor-equalized image data in the internal memory and changes the scale factor of the image data in accordance with the operator specified scale factor. Accordingly, a problem with this technique is that the relevant burden on the memory or image scale factor changing process becomes heavier, which reduces the number of pages for image data which can be read.

On the other hand, instead of the above control, another type of image forming device performs control which, upon reading, reads the image while changing the scanner moving speed in accordance with the operator specified scale factor and which then stores the scale factor-changed image data in the internal memory, the control subsequently forming the corresponding scale factor-changed image on the sheet. This control differs from the above and, upon reading, reads the image having its scale factor changed. This control varies the scanner moving speed in increments of 1% in accordance with the operator specified scale factor, which ranges widely from, for example, 25 to 400%. It is thus necessary to employ a motor that does not vibrate vigorously over a wide range of scanner moving speeds, as well as its driving circuit. This disadvantageously increases costs. Thus, in recent years, a technique called hybrid zoom control has been proposed (Document 3).

In hybrid zoom control, the document is read using a predetermined reading scale factor and at a reading speed corresponding to the reading scale factor, and stores and holds the read data in the storage section. Image processing is then executed, that is, enlargement, contraction, or scale factor equalizing to enable a scale factor-changed image to be output. The predetermined scale factor may be the same as or different from the operator specified scale factor. If the operator specified scale factor is the same as the predetermined reading scale factor, the image processing is an image scale factor equalizing process. If the operator specified scale factor is larger than the predetermined reading scale factor, the image processing is an image enlarging process. If the operator specified scale factor is smaller than the predetermined reading scale factor, the image processing is an image contracting process.

The employment of the hybrid zoom control eliminates the need to vary the scanner moving speed in increments of 1% in accordance with the operator specified scale factor, which ranges widely from, for example, 25 to 400%. This in turn obviates the need for an expensive scanner motor and its driving circuit, thus reducing the cost.

[Patent Document 1] Jpn. Pat. Appln. KOKAI Publication No. 2003-87522 (Document 1)

[Patent Document 2] Jpn. Pat. Appln. KOKAI Publication No. 2003-87522 (Document 2)

[Patent Document 3] Jpn. Pat. Appln. KOKAI Publication No. 2001-77980 (Document 3)

BRIEF SUMMARY OF THE INVENTION

As described above, the hybrid zoom control is free from the disadvantage of increasing the burden on the memory or image scale factor changing process. It is an object of the present invention to provide an image forming device that can use the hybrid zoom control to reduce the burden on the memory or image scale factor changing process to obtain high-quality scale-factor-changed images.

That is, the present invention employs the hybrid zoom control in which one of predetermined reading speeds is selected in accordance with an operator specified scale factor and an image is read at the predetermined reading speed, the hybrid zoom control then controlling image processing inside the device to change the scale factor of the image and subsequently storing the resultant image. Accordingly, a required read area is read in accordance with a reading scale factor. The present invention can thus provide an image forming device that can reduce the burden on the memory or image scale factor changing process to obtain high-quality scale-factor-changed images.

An image forming device according to an aspect of the present invention comprises a photoelectric converting means for reading an image from a document as line-like reflected light traveling in a main scanning direction, scanning means for relatively moving the photoelectric converting means and the image from the document, first setting means for setting a reading scale factor for the image from the document and second setting means for setting the size of an image formed medium.

The image forming device also includes determining means for determining to which of a plurality of divided ranges the reading scale factor set by the first setting means belongs, moving means for moving the scanning means at a specified moving speed corresponding to the range determined by the determining means, the specified moving speed varying with the ranges and calculating means for calculating a distance the scanning means moves on the basis of the reading scale factor set by the first setting means and the size of the image formed medium set by the second setting means.

The image forming device further includes storing means for storing the image read by the photoelectric converting means while the moving means is moving the scanning means at the moving speed corresponding to the reading scale factor over the moving distance calculated by the calculating means, in a storage area based on the moving distance and moving speed of the scanning means, processing means for changing a scale factor of the image data stored in the storage area to one corresponding to a difference between the reading scale factor set by the first setting means and a reading scale factor corresponding to the moving speed of the scanning means and image forming means for forming an image on the image formed medium on the basis of the image data having its scale factor changed by the processing means.

An image forming device according to another aspect of the present invention comprises a photoelectric converting means for reading an image from a document as line-like reflected light traveling from a document as line-like reflected light traveling in a main scanning direction, scanning means for relatively moving the photoelectric converting means and the image from the document, first setting means for setting a reading scale factor for the image from the document and second setting means for setting the size of an image formed medium.

The image forming device also includes selecting means for selecting a second reading speed corresponding to a reading scale factor of 50% when the reading scale factor set by the first setting means is within the range of 25 to 50%, selecting a first reading speed corresponding to a reading scale factor of 100% when the reading scale factor set by the first setting means is within the range of 51 to 100%, and selecting a third reading speed corresponding to a reading scale factor of 200% when the reading scale factor set by the first setting means is within the range of 101 to 400%, moving means for moving the scanning means at the reading speed selected by the selecting means and calculating means for calculating a distance the scanning means moves on the basis of the reading scale factor set by the first setting means and the size of the image formed medium set by the second setting means.

The image forming device further includes storing means for storing the image read by the photoelectric converting means while the moving means is moving the scanning means at the moving speed corresponding to the reading scale factor over the moving distance calculated by the calculating means, in a storage area based on the moving distance and moving speed of the scanning means, processing means for changing a scale factor of the image data stored in the storage area to one corresponding to a difference between the reading scale factor set by the first setting means and a reading scale factor corresponding to the moving speed of the scanning means and image forming means for forming an image on the image formed medium on the basis of the image data having its scale factor changed by the processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram illustrating a control system of the digital copier;

DETAILED DESCRIPTION OF THE INVENTION

An embodiment of the present invention will be described below with reference to the drawings.

Figure 1:
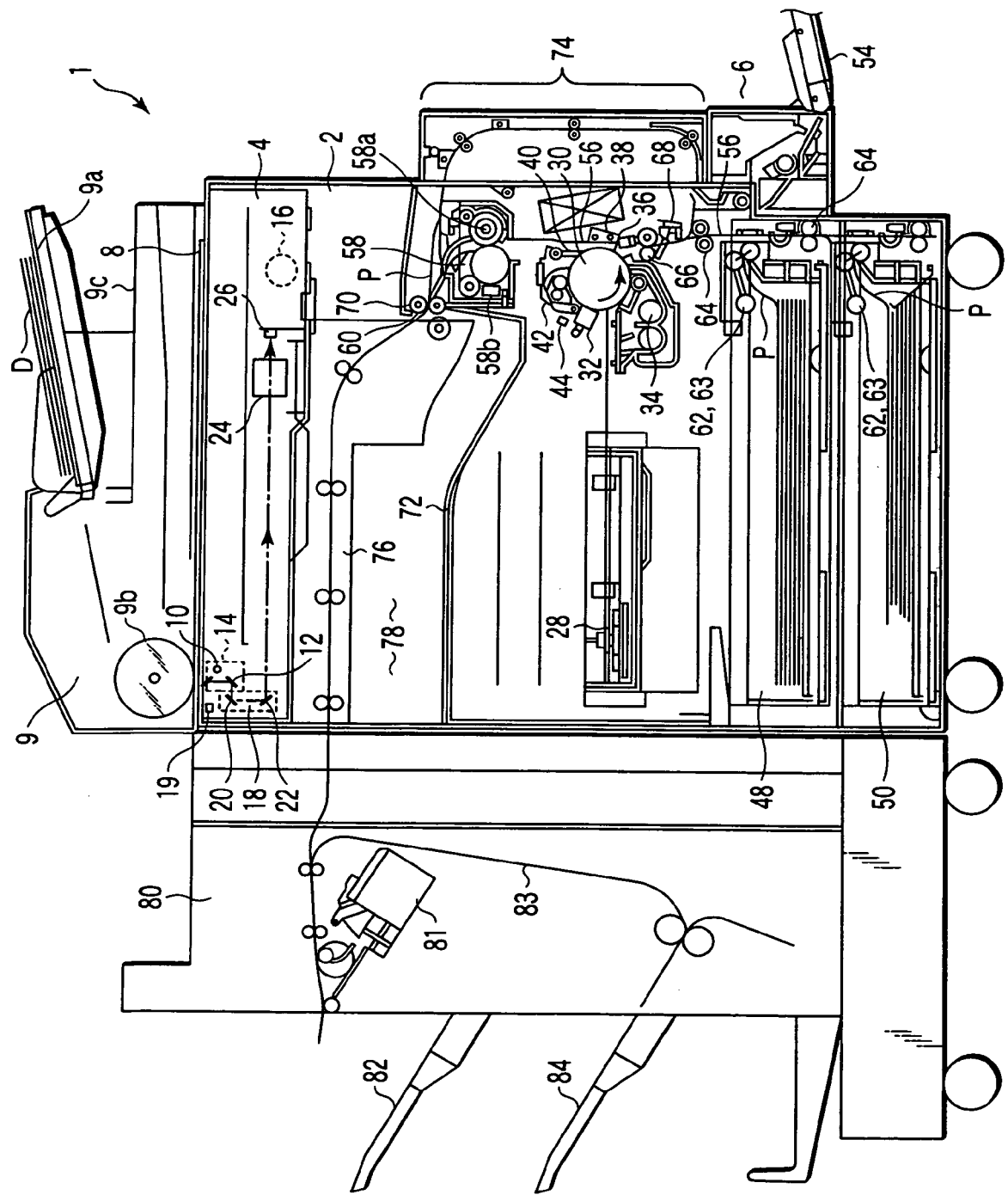
FIG. 1 is a sectional view of the general configuration of a digital copier illustrating an embodiment of the present invention.

FIG. 1 is a sectional view showing the general configuration of a digital copier 1 serving as an example of an image forming device according to the present invention.

As shown in FIG. 1, the digital copier 1 comprises a device main body 2. A scanner section 4 serving as reading means and a printer section 6 functioning as image forming means are provided in the device main body 2.

A copy board 8 on which a reading object, that is, documents D are placed is provided on a top surface of the device main body 2. Further, an automatic document feeding device 9 (hereinafter referred to as ADF) is disposed on the top surface of the device main body 2; ADF serves as conveying means for automatically feeding the documents D onto the copy board 8.

The documents D placed on a document tray 9a of ADF 9 are conveyed using a conveying guide (not shown). The documents D are then discharged onto a discharge tray 9c via a platen roller 9b. Thus, while being conveyed by the platen roller 9b, the documents D are exposed and scanned using an exposure lamp 10 of a scanner section 4, described later. Images are thus read from the documents D.

The documents D are set in the document tray 9a of ADF 9 with their read surface upward. The documents D are loaded one by one starting with the uppermost one.

The scanner section 4 disposed in the device main body 2 has an exposure lamp 10 composed of, for example, a halogen lamp to illuminate the documents D conveyed by ADF 9 or placed on the copy board 8, and a first mirror 12 that polarizes reflected light from the documents in a predetermined direction. The exposure lamp 10 and the first mirror 12 are mounted on a first carriage 14 disposed below the copy board 8.

The first carriage 14 is placed so as to move parallel to the copy board 8. The first carriage 14 is reciprocated below the copy board 8 by a scanner motor 16 (driving motor) via a toothed belt (not shown) or the like. The scanner motor 16 is composed of a stepping motor.

Further, a second carriage 18 that can move parallel to the copy board 8 is disposed below the copy board 8. Second and third mirrors 20 and 22 are mounted on the second carriage perpendicularly to each other and sequentially polarize reflected light from the document D which is polarized by the first mirror 12. The rotating force of the scanner motor 16 is transmitted to the second carriage 18 via the toothed belt or the like. The second carriage 18 moves in unison with the first carriage 14. Furthermore, the second carriage 18 moves along and parallel to the copy board 8 at a speed half that of the first carriage 14.

A scanner is composed of the first carriage 14 and second carriage 18. The first carriage 14 and the second carriage 18 are driven using wires. The second carriage 18 moves at a speed half that of the first carriage 14. Here, the speed at which the first carriage 14 of the scanner moves is defined as the speed at which the documents are read. (The moving speed of the first carriage will hereinafter referred to as a scanner moving speed or reading speed.)

Further, an image forming lens 24 and a CCD sensor (line sensor) 26 are disposed below the copy board; the image forming lens 24 focuses reflected light from the third mirror 20 mounted on the second carriage 18 and the CCD sensor 26 receives the reflected light focused by the image forming lens 24. The image forming lens 24 is disposed in a surface containing the optical axis of light polarized by the third mirror 22. The CCD sensor 26 photoelectrically converts the incident reflected light in accordance with an image processing clock provided by a main CPU described later. The CCD sensor 26 thus outputs an electric signal corresponding to the document D read.

When the document D conveyed by the ADF 9 is read, a position irradiated with light from the exposure lamp 10 is fixed, as shown in FIG. 2. Further, when the document D placed on the copy board 8 is read, the position irradiated with light from the exposure lamp 10 is shifted from left to right along the copy board 8.

On the other hand, a printer section 6 comprises a laser exposure device 28 operating as latent image forming means. An electrostatic latent image is formed on a peripheral surface of a photosensitive drum by scanning the peripheral surface of the photosensitive drum 30 using laser light from the laser exposure device 28.

Further, the printer section 6 has the rotatable photosensitive drum 30 disposed almost in the center of the device main body and closer to its right end, and which operates as an image carrier. The peripheral surface of the photosensitive drum 30 is exposed to laser light from the laser exposure device 28 to form a desired electrostatic latent image. The peripheral surface of the photosensitive drum 30 is integrated with a charger 32 that charges the peripheral surface of the drum to a predetermined charge, a developing device 34 that supplies toner as a developer to the electrostatic latent image formed on the peripheral surface of the photosensitive drum 30 to develop the image at a desired image density, and a releasing charger 36 that separates an image formed medium fed from a cassette 48 or 50 described later, that is, copy paper P, from the photosensitive drum 30. The following components are sequentially arranged on the peripheral surface of the photosensitive drum: a transfer charger 38 that transfers a toner image formed on the photosensitive drum 30 to the paper P, a releasing pawl 40 that releases the copy paper P from the peripheral surface of the photosensitive drum 30, a cleaning device 42 that removes toner remaining on the peripheral surface of the photosensitive drum 30, and a static eliminator 44 that eliminates electrical charge from the peripheral surface of the photosensitive drum 30.

The upper cassette 48 and lower cassette 50 that can be withdrawn out of the device main body are disposed below the device main body 2 so that they are stacked. Sheets of copy paper P of different sizes are charged in the respective cassettes 48 and 50. A manual tray 54 is provided on a side of the upper cassette 48.

A conveying path 56 is formed in the device main body 2; the conveying path 56 extends from the cassettes 48 and 50 through a transfer section located between the photosensitive drum 30 and the transfer charger 38. A fixing device 58 having a fixing lamp 58a is provided at a terminal of the conveying path 56. A discharge port 60 is formed above the fixing device 58.

A paper feeding roller 62 and a separating roller 63 are provided near the upper cassette 48 and the lower cassette 50; the paper feeding roller 62 and the separating roller 63 take the sheets of paper P out of the cassettes 48 and 50 one by one. Further, the conveying path 56 is provided with a large number of paper feeding roller pairs 64 that convey the copy paper P through the conveying path 56, the paper being taken out by the paper feeding roller 62 and separating roller 63.

In the conveying path 56, a resist roller pair 66 is provided upstream of the photosensitive drum 30. The resist roller pair 66 corrects the inclination of the copy paper P taken out and aligns the leading end of the toner image on the photosensitive drum 30 with the leading end of the copy paper P. The resist roller pair 66 then feeds the copy paper P to the transfer section at the same speed as the one at which the peripheral surface of the photosensitive drum 30 moves. A pre-aligning sensor 68 is provided in front of the resist roller pair 66, that is, close to the paper feeding rollers 64, to detect that the copy paper P has arrived.

The paper feeding roller pairs 64 feed sheets of copy paper P taken by the paper feeding roller 62 out of the cassettes 48 and 50 one by one, to the resist roller pair 66. Then, the sheets of copy paper P have their leading ends aligned by the resist roller pair 66 and are then fed to the transfer section.

In the transfer section, the transfer charger 38 transfers a developer image, that is, a toner image, formed on the photosensitive drum 30 onto the paper P. The copy paper P to which the toner image has been transferred is released from the peripheral surface of the photosensitive drum 30 under the effect of the releasing charger 36 and releasing pawl 40. The copy paper P is then transferred to the fixing device 58 via a conveying belt (not shown) partly consisting of the conveying path 56. Then, the fixing device 58 melts and fixes the developer image to the copy paper P. A discharge roller pair 70 then discharges the copy paper P through the discharge port 60.

An automatic double side device 74 is provided to the right of the conveying path 56 to reverse the copy paper P having passed through the fixing device 58 and then feed the paper P to the conveying path 56 again.

The discharge port 60 is provided with directing lever (not shown) to direct the copy paper P discharged from the discharge port 60, onto a discharge tray 72 in the device main body 2 or to an external conveying mechanism 76. The external conveying mechanism 76 is installed in an upper cavity portion 78 of the discharge tray 72 in the device main body 2 to convey the copy paper P discharged from the discharge port 60, to the exterior of the device main body 2.

Further, a finisher 80, which is an optional device, is installed on a side of the device main body 2. The finisher 80 is supplied with the copy paper P conveyed by the external conveying mechanism 76 (the back surface of the paper P is printed).

The finisher 80 uses a stapler 81 to staple a number of documents (paper P) supplied at their rear ends, the documents constituting a book. The finisher 80 then collects the documents on a tray 82. The tray can be moved up and down and lowers on the basis of the loading of the documents.

Further, the copy paper P supplied to the finisher 80 is conveyed through a reverse conveying path 83. The copy paper P is discharged onto a tray 84 with its printed surface upward.

An operation panel (described later) is provided in the upper part of a front surface of the device main body to give instructions concerning various copying conditions, such as a copy scale factor and an instruction for the start of copying.

The digital copier 1 may be used for a single purpose or may also be used as a network printer.

In this case, the digital copier 1 is connected to personal computers (PC; no shown) and servers (not shown) via a local network (LAN) (not shown).

Figure 4:
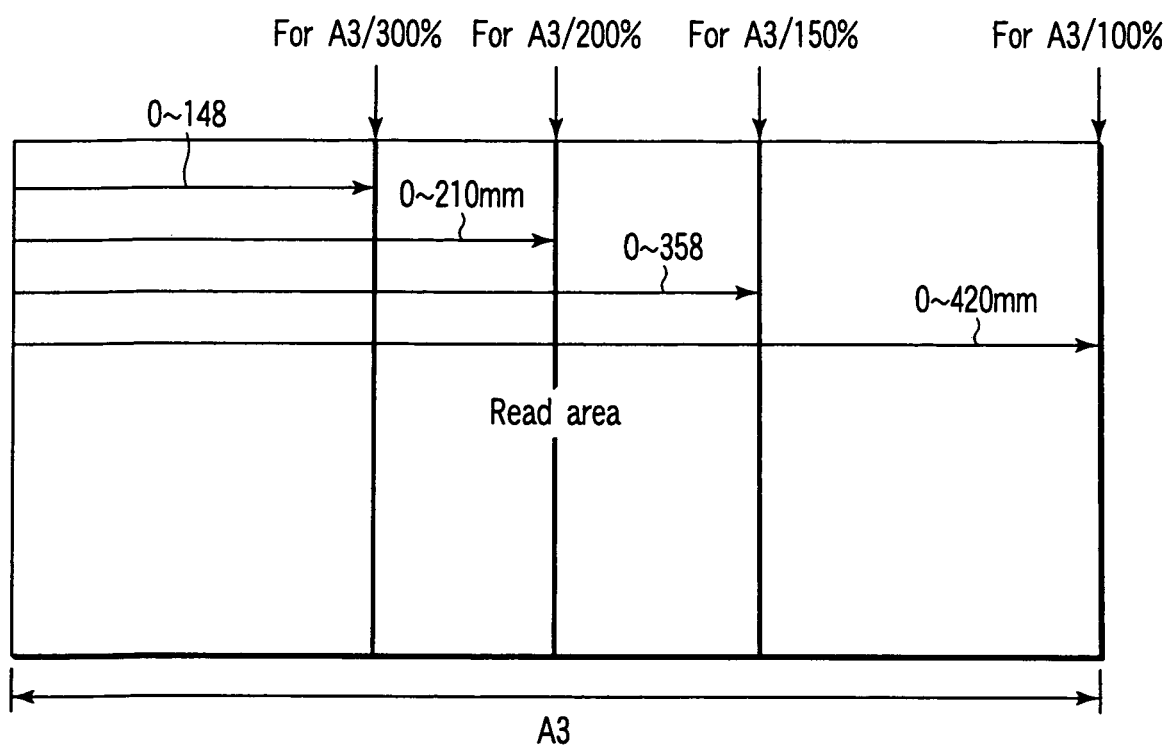
FIG. 4 is a diagram illustrating a area read by the scanner.

With reference to FIG. 4, description will be given of the internal configuration of a control circuit of the digital copier 1.

Description will now be given of the configuration of a control system of the digital copier.

FIG. 2 is a block diagram schematically showing electric connections in the digital copier and the flow of signals for control.

As shown in FIG. 2, the digital copier 1 main body is composed of a main control section 100, a scanner section 4, a printer section 6, and an operation panel 90. Further, the digital copier 1 main body connects to the finisher 80 and ADF 9, which are optional devices. The operation panel 90 connects to, for example, an operation panel CPU 91 that controls the whole operation panel, a print key 92 that gives an instruction for the start of copying, an input device 93 provided with, for example, a plurality of pushbutton switches, or a touch panel, used to input the number of sheets to be copied or printed, a scale factor, a specification for partial copying, and the coordinates of an area for the partial copying, and ten keys 94 utilized to set the number of sheets to be copied.

The main control section 100 is composed of a system CPU 101, a ROM 102, a RAM 103, an NVM 104, an image processing section 106, and the like.

The system CPU 101 controls the whole main control section 100. The ROM 102 stores various control programs. The RAM 103 temporarily stores data. The NVM (NonVolatile RAM) 104 is a nonvolatile memory backed up by batteries (not shown). A shared RAM (not shown) is provided for bidirectional communications between the system CPU 101 and the printer CPU 131 and between the system CPU 101 and the printer CPU 131.

The image processing section 106 consists of an image processing circuit or the like to execute image processing such as trimming, masking, or the compression or decompression of an image. The image processing section 106 compresses image data read by the scanner section 4 to convert the data into an image file. Further, the image processing section 106 converts the image data into an image file.

Now, the scanner section 4 will be described. The scanner section 4 is composed of a scanner CPU 131, a ROM 132, an internal memory 133 such as a RAM, a shading correcting ASIC 134, a CCD driver 135, a scan motor drive 136, and an exposure lamp regulator 137.

The scanner CPU 131 controls the whole scanner section 4. The ROM 132 stores control programs and the like. The shading correcting ASIC 134134 consists of an A/D converting circuit, a shading correcting circuit, a gamma correcting circuit, and the like which process a signal from the CCD sensor 26. The CCD driver 135 controls the CCD sensor 26. The scan motor driver 136 drives the scan motor 16. The exposure lamp regulator 137 controls the lighting of the exposure lamp 10. The scanner CPU 131 makes various settings for the scan motor driver 136 to control the scan motor 16. A scan image is enlarged or contracted on the basis of an INPUT scale factor set by an operator using the input device 93. However, the INPUT scale factor is reflected in a main scanning direction (the direction of the CCD line sensor) by the system CPU 106 by setting a scale factor for the image processing section 106. The INPUT scale factor is reflected in a sub-scanning direction (the moving direction of the scanner) by varying the moving speed of the scanner for enlargement or contraction. In other words, the rotation speed of the scan motor can be varied on the basis of a driving pulse for the scan motor 16 indicated by the scanner CPU 131 to the scan motor driver 136 as well as a set excitation system. This operation enables a change in the scanner moving speed, which is a reading speed.

This embodiment will be described in connection with the scan motor 16 composed of a two-phase stepping motor.

The scan motor 16 is controlled by the scanner 131 by setting, for the scan motor driver 136, eight values for seven signals concerning the control of the motor and a memory mapped address with which a scan motor driving current value is set for D/A. The driving of the scanner include acceleration (through up), equal-speed, and deceleration (through down) driving. The scanner moves a distance slightly longer than the document.

Now, the printer section 6 will be described. The printer section 6 is composed of a printer CPU 141, a ROM 142, a RAM 143, a laser driver 145, a polygon motor driver 146, a main motor driver 147, the charging charger 38, the fixing lamp 58a, a heat roller temperature sensor 58b, and the like.

The printer CPU 141 controls the whole printer section 6. The laser driver 145 controls the laser exposure device 27. To form an electrostatic latent image on the photosensitive drum 30, serving as an image carrier, the laser driver 145 controls light emissions from the semiconductor laser of the laser exposure device 28. Further, the laser driver 145 controls the rotation of the polygon motor 29 to guide light from the semiconductor laser 28 to the photosensitive drum 30. The main motor driver 146 controls the rotation of a main motor (not shown).

A specific description will be given of the embodiment configured as described above. Description will be given of a control sequence for the scanner according to the present embodiment. Specifically, a sequential description will be given in brief of control performed during a process from power-on to scanning. The order of control will be shown below using (1) to (6).

<Powering on the Digital Copier>

(1) Operation of initializing the scanner (2) Peak detection control (3) Operation of moving the indicator <Starting Copying>

Black shading process (if black shading is carried out only once rather than for every correction, it is executed in (4))

Process of moving the scanner to its home position (process of moving the scanner to its home position during a normal scan)

Scan Operation (Forward or Backward)

The control of the scanner in (1) to (6) will be described.

Description will be given of the process of initializing the scanner in (1).

A position sensor 19 for the scanner is placed near an end of a frame of the scanner section 4. The scanner is moved, and the position sensor 19 senses part of the scanner 19. The scanner 19 is stopped after being allowed to move a predetermined distance after being sensed by the position sensor 19.

The description of the following operations is omitted: the (2) peak detection control, the (3) operation of moving the indicator, the (4) black shading correcting process, and the (5) process of moving the scanner to its home position.

The scan operation in (6) will be described.

The scan operation reads a document. The scanner operates as follows. For a normal scan, the scanner first moves a distance equal to the [document size]+[accelerating or decelerating distance] from a scan start position in a forward direction. After the movement, the scanner is stopped for a specified time without turning off excitation. The document is read during the forward movement. Then, the scanner is moved backward to return to the scan start position. The scanner is then stopped at the scan start position. The scanner continues to be excited for a specified time. Then, the excitation is turned off. The scan operation has been described.

Now, description will be given of hybrid zoom control employed in the embodiment of the present invention.

In hybrid zoom control, document is read using a predetermined reading scale factor and at a reading speed corresponding to the reading scale factor and temporarily stores the read data in the storage section. The hybrid zoom control subsequently executes image processing, that is, enlargement, contraction, or scale factor equalizing to enable a scale factor-changed image to be output. The predetermined scale factor may be the same as or different from the operator specified scale factor. If the operator specified scale factor is the same as the predetermined reading scale factor, the image processing is an image scale factor equalizing process. If the operator specified scale factor is larger than the predetermined reading scale factor, the image processing is an image enlarging process. If the operator specified scale factor is smaller than the predetermined reading scale factor, the image processing is an image contracting process.

According to an embodiment of the present invention, the operator inputs a specified scale factor through the input device, which is a setting section. The control section determines the operator specified scale factor to select one of first, second, and third reading speeds that are predetermined ones. The first reading speed corresponds to a reading speed of 100%. The second reading speed is higher than the first one and corresponds to a reading speed of 50%. The third reading speed is lower than the first one and corresponds to a reading speed of 200%.

This control has a step of selecting the second reading speed if the operator specified scale factor input is at most 50% and a step of selecting the first reading speed if the operator specified scale factor input is at most 100%, and otherwise selecting the third reading speed.

Figure 3:
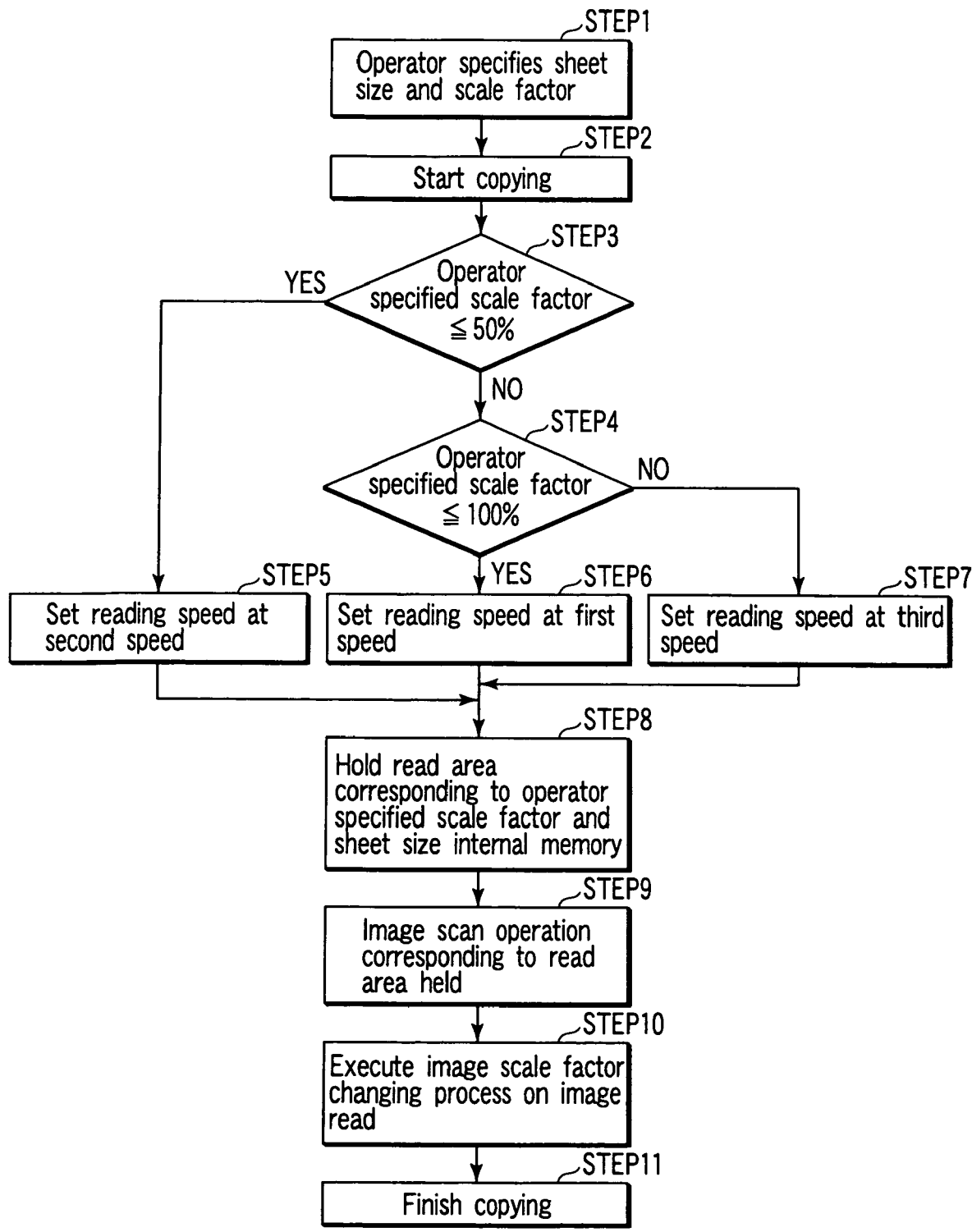
FIG. 3 is a flow chart illustrating a reading process executed by a scanner.

The embodiment will be sequentially described with reference to the flowchart in FIG. 3 and FIG. 4.

The operator sets a specified scale factor and a sheet size (STEP 1). The operator then depresses a start key (STEP 2).

The main control section 100 determines the scale factor specified by the operator to select one of the predetermined reading speeds. The reading scale factors are 50, 100, and 200%. The first reading speed corresponds to a reading speed of 100%. The second reading speed corresponds to a reading speed of 50%. The third reading speed corresponds to a reading speed of 200%.

The control is not related to any document size, so that conditions for the document size are omitted. If the operator specifies a scale factor of 50% and A4-sized sheets on which images are to be formed, the second reading speed is selected (STEP 3 and STEP 5). In this case, the operator specified scale factor is equal to the reading scale factor. Accordingly, the turn-off of image scale factor changing (scale factor equalizing process) is selected. The actual read area of the document is twice as large as the A4 size in accordance with the operator specified scale factor (this is equivalent to an A3 size). This read area is held in the internal memory 133 (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (scale factor equalizing process) is executed on the image read by the scan operation (STEP 10). The image data is output to the image forming section to finish the scan (STEP 11).

If the operator specifies a scale factor of 25% and A4-sized sheets on which images are to be formed, the second reading speed is selected (STEP 3 and STEP 5). In this case, the operator specified scale factor is smaller than the reading scale factor. Accordingly, image contraction scale factor changing is selected. The actual read area of the document is four times as large as the A4 size in accordance with the operator specified scale factor. However, since the maximum size is A3 (if the A sizes are used), an area twice as large as the A4 size (this area is equivalent to the A3 size) is held in the internal memory 133 (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (contraction scale factor changing process) is executed on the image read by the scan operation (STEP 10). The image data is output to the image forming section to finish the scan (STEP 11).

If the operator specifies a scale factor of 100% and A4-sized sheets on which images are to be formed, the first reading speed is selected (STEP 3, STEP 4, and STEP 6). In this case, the operator specified scale factor is equal to the reading scale factor. Accordingly, the turn-off of image scale factor changing (scale factor equalizing process) is selected. The actual read area of the document is equal to the A4 size in accordance with the operator specified scale factor. This read area is held in the internal memory 133 (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (scale factor equalizing process) is executed on the image read by the scan operation (STEP 10). The image data is output to the image forming section to finish the scan (STEP 11).

If the operator specifies a scale factor of 75% and A4-sized sheets on which images are to be formed, the first reading speed is selected (STEP 3, STEP 4, and STEP 6). In this case, the operator specified scale factor is smaller than the reading scale factor. Accordingly, image contraction scale factor changing is selected. The actual read area of the document is 1.33 times as large as the A4 size in accordance with the operator specified scale factor. This read area is held in the internal memory (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (contraction scale factor changing process) is executed on the image read by the scan operation (STEP 10). The image data is output to the image forming section to finish the scan (STEP 11).

If the operator specifies a scale factor of 200% and A4-sized sheets on which images are to be formed, the third reading speed is selected (STEP 3, STEP 4, and STEP 7). In this case, the operator specified scale factor is equal to the reading scale factor. Accordingly, the turn-off of image scale factor changing (scale factor equalizing process) is selected. The actual read area of the document is half the A4 size in accordance with the operator specified scale factor. This read area is held in the internal memory 133 (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (scale factor equalizing process) is executed on the image read by the scan operation (STEP 10). The image data is output to the image forming section (printer 6) to finish the scan (STEP 11).

If the operator specifies a scale factor of 150% and A4-sized sheets on which images are to be formed, the third reading speed is selected (STEP 3, STEP 4, and STEP 7). In this case, the operator specified scale factor is smaller than the reading scale factor. Accordingly, image contraction scale factor changing is selected. The actual read area of the document is larger that the one set using a reading driving scale factor, in accordance with the operator specified scale factor and. An area 0.67 times as large as the A4 size is held in the internal memory (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (contraction scale factor changing process) is executed on the image read by the scan operation (STEP 10). The image data is output to the image forming section to finish the scan (STEP 11).

If the operator specifies a scale factor of 300% and A4-sized sheets on which images are to be formed, the third reading speed is selected (STEP 3, STEP 4, and STEP 7). In this case, the operator specified scale factor is larger than the reading scale factor. Accordingly, image enlargement scale factor changing is selected. The actual read area of the document is smaller that the one set using a reading driving scale factor, in accordance with the operator specified scale factor. An area 0.33 times as large as the A4 size is held in the internal memory 133 (STEP 8). Using the area held in the internal memory 133 as a document size for a scan operation, the carriage is moved forward a distance equal to the [document size]+[accelerating or decelerating distance] from the scan start position, to perform a reading operation (STEP 9). An image scale factor changing process (enlargement scale factor changing process) is executed on the image read by the scan operation (STEP 10). The image data is output to the image forming section to finish the scan (STEP 11).

As described above, according to the embodiment of the present invention, the image forming device employs the hybrid zoom control which selects one of the predetermined reading speeds in accordance with the operator specified scale factor and which then reads the image at the predetermined reading speed, the hybrid zoom control then controlling the image processing inside the device to change the scale factor of the image and subsequently storing the resultant image. Accordingly, the required read area is read in accordance with the reading scale factor. Therefore, the present invention can provide an image forming device that can reduce the burden on the memory or image scale factor changing process to obtain high-quality scale-factor-changed images.

In the embodiment of the present invention, the reading scale factor is limited to 50, 100, and 200%. However, the reading scale factors may be changed or the number of such scale factors may be increased.

Alternatively, instead of using the document feeding device to move the scanner, it is possible to use reading means for reading the document while conveying it at a predetermined speed. In this case, the speed at which the document is conveyed is the reading speed. The read area of the document can be similarly controlled.

Figure 5:
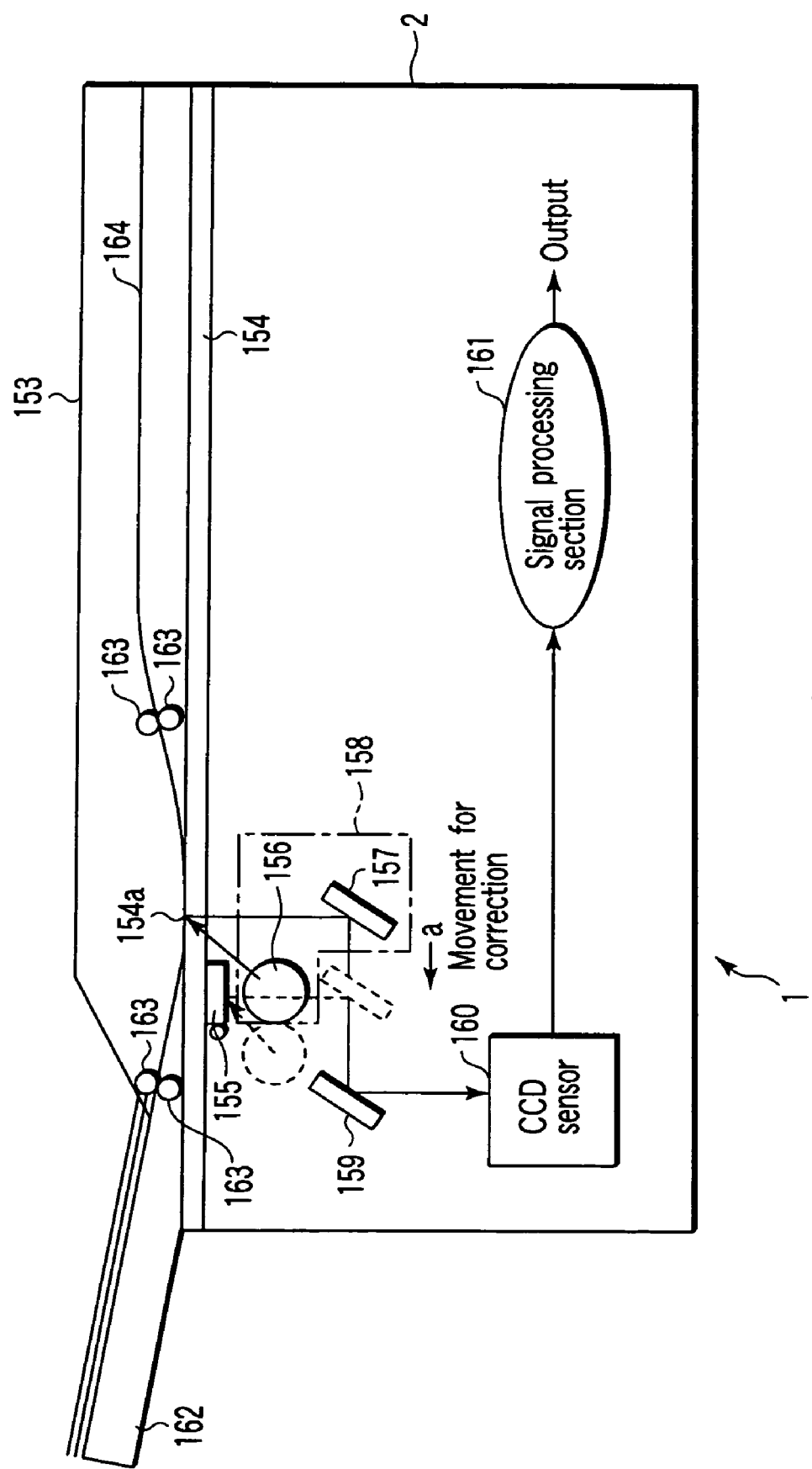
FIG. 5 is a diagram illustrating another example of the configuration of a scanner section.

In this case, FIG. 5 shows the general configuration of the scanner section 151 such as the one described above.

The scanner section 151 is composed of a main body 152 incorporating a reading optical system and a sheet-feeder-type automatic feeding device 153 mounted on the main body 152.

Transparent glass 154 is provided on a top surface portion of the main body 152. A white reference plate (shading correcting plate) 155 is provided below a left end of the glass 4; the white reference plate is used to read a reference value for shading corrections. A document irradiated position 154a associated with document reading corresponds to a part of the surface of the glass 4 which is located on the right side of the white reference plate 155.

A xenon lamp 156 and a carriage 158 are provided in the main body so as to be movable (in the direction in which the document is conveyed); the xenon lamp 156 serves as an exposure lamp and a mirror 157 is mounted on the carriage 158. As the carriage 158 moves, a position irradiated with light from the xenon lamp 156 moves between the two points, that is, between the document irradiation position 154a and the read position of the white reference plate 155. Before the document is read, the irradiated position is placed at (moves to) the reading position of the white reference plate 155. After the white reference plate 155 has been irradiated with light for reading, the irradiated position is placed at (moves to) the document irradiated position 54a. While the document is being read, the position irradiated with light from the xenon lamp remains fixed to the document irradiated position 154a.

While the document is being read, the xenon lamp 156 is located as shown by a solid line in FIG. 5. While the white reference plate 115 is being read, the xenon lamp 156 is located as shown by a broken line in FIG. 5.

When the position irradiated with light from the xenon lamp 156 corresponds to the document irradiated position 154a, the xenon lamp 156 emits light of a certain width traveling in the main scanning direction (the length direction of the xenon lamp 156), to the document irradiated position 154a; the width corresponds to a part of the document which is to be read. The document is thus exposed.

Further, a mirror 159 and a CCD line sensor 160 are provided in the main body 152. The mirror 159 is fixed to the main body 152. Thus, light emitted by the xenon lamp 159 and then reflected by the white reference plate 155 or document irradiated position 154a is guided to the CCD line sensor 160 via the mirrors 157 and 159 and an image forming lens (not shown). The CCD line sensor 160 photoelectrically converts the incident reflected light to output an electric signal corresponding to the reflected light. Further, a signal processing section 161 is supplied with the electric signal output by the CCD line sensor 160. The signal processing section 161 executes processing such as amplification, A/D conversion, shading correction, or the like. The processed image data is output to an external apparatus such as a personal computer (PC) or a printer (not shown).

The automatic feeding device 153 is composed of a copy board 162 on which a plurality of documents are placed, a conveying system 163 such as a conveying roller which loads and conveys the documents from the copy board 162 one by one via the document irradiated position 154a (in the sub-scanning direction), and a tray 164 to which the documents conveyed by the conveying system 163 to pass through the document irradiated position 154a are discharged.

That is, the present invention is not limited to the above embodiments. In implementation, variations may be made to the components of the embodiments without departing from the spirit of the present invention. Further, various inventions can be formed by appropriately combining a plurality of components disclosed in the above embodiments. For example, it is possible to omit some of the components shown in the embodiments. Moreover, the components included in different embodiments may be appropriately combined together.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming device, comprising:
photoelectric converting means for reading an image from a document as line-like reflected light traveling in a main scanning direction;
scanning means for relatively moving the photoelectric converting means and the image from the document;
first setting means for setting a reading scale factor for the image from the document;
second setting means for setting the size of an image formed medium;
determining means for determining to which of a plurality of divided ranges the reading scale factor set by the first setting means belongs;
moving means for moving the scanning means at a specified moving speed corresponding to the range determined by the determining means, the specified moving speed varying with the ranges;
calculating means for calculating a distance the scanning means moves on the basis of the reading scale factor set by the first setting means and the size of the image formed medium set by the second setting means;
storing means for storing the image read by the photoelectric converting means while the moving means is moving the scanning means at the moving speed corresponding to the reading scale factor over the moving distance calculated by the calculating means, in a storage area based on the moving distance and moving speed of the scanning means,
processing means for changing a scale factor of the image data stored in the storage area to one corresponding to a difference between the reading scale factor set by the first setting means and a reading scale factor corresponding to the moving speed of the scanning means, and
image forming means for forming an image on the image formed medium on the basis of the image data having its scale factor changed by the processing means.

2. An image forming device, comprising:
photoelectric converting means for reading an image from a document as line-like reflected light traveling in a main scanning direction;
scanning means for relatively moving the photoelectric converting means and the image from the document;
first setting means for setting a reading scale factor for the image from the document;
second setting means for setting the size of an image formed medium;
selecting means for selecting a second reading speed corresponding to a reading scale factor of 50% when the reading scale factor set by the first setting means is within the range of 25 to 50%, selecting a first reading speed corresponding to a reading scale factor of 100% when the reading scale factor set by the first setting means is within the range of 51 to 100%, and selecting a third reading speed corresponding to a reading scale factor of 200% when the reading scale factor set by the first setting means is within the range of 101 to 400%;
moving means for moving the scanning means at the reading speed selected by the selecting means;
calculating means for calculating a distance the scanning means moves on the basis of the reading scale factor set by the first setting means and the size of the image formed medium set by the second setting means;
storing means for storing the image read by the photoelectric converting means while the moving means is moving the scanning means at the moving speed corresponding to the reading scale factor over the moving distance calculated by the calculating means, in a storage area based on the moving distance and moving speed of the scanning means;
processing means for changing a scale factor of the image data stored in the storage area to one corresponding to a difference between the reading scale factor set by the first setting means and a reading scale factor corresponding to the moving speed of the scanning means; and
image forming means for forming an image on the image formed medium on the basis of the image data having its scale factor changed by the processing means.

3. An image forming device, comprising:
a photoelectric converting device configured to read an image from a document as line-like reflected light traveling in a main scanning direction;
a scanner configured to relatively move the photoelectric converting device and the image from the document;
a first setting portion configured to set a reading scale factor for the image from the document;
a second setting portion configured to set the size of an image formed medium;
a determining portion configured to determine to which of a plurality of divided ranges the reading scale factor set by the first setting portion belongs;
a moving section configured to move the scanner at a specified moving speed corresponding to the range determined by the determining portion, the specified moving speed varying with the ranges;

a calculating section configured to calculate a distance the scanner moves on the basis of the reading scale factor set by the first setting portion and the size of the image formed medium set by the second setting portion;

a storing portion configured to store the image read by the photoelectric converting device while the moving section is moving the scanner at the moving speed corresponding to the reading scale factor over the moving distance calculated by the calculating section, in a storage area based on the moving distance and moving speed of the scanner, a processor configured to change a scale factor of the image data stored in the storage area to one corresponding to a difference between the reading scale factor set by the first setting means and a reading scale factor corresponding to the moving speed of the scanning means, and an image forming portion configured to form an image on the image formed medium on the basis of the image data having its scale factor changed by the processor.

4. An image forming device, comprising:

a photoelectric converting device configured to read an image from a document as line-like reflected light traveling in a main scanning direction;

a scanner configured to relatively move the photoelectric converting device and the image from the document;

a first setting portion configured to set a reading scale factor for the image from the document;

a second setting portion configured to set the size of an image formed medium;

a selecting portion configured to select a second reading speed corresponding to a reading scale factor of 50% when the reading scale factor set by the first setting means is within the range of 25 to 50%, select a first reading speed corresponding to a reading scale factor of 100% when the reading scale factor set by the first setting portion is within the range of 51 to 100%, and select a third reading speed corresponding to a reading scale factor of 200% when the reading scale factor set by the first setting portion is within the range of 101 to 400%;

a moving section configured to move the scanner at the reading speed selected by the selecting portion;

a calculating section configured to calculate a distance the scanner moves on the basis of the reading scale factor set by the first setting portion and the size of the image formed medium set by the second setting portion;

a storing portion configured to store the image read by the photoelectric converting device while the moving section is moving the scanner at the moving speed corresponding to the reading scale factor over the moving distance calculated by the calculating section, in a storage area based on the moving distance and moving speed of the scanner;

a processor configured to change a scale factor of the image data stored in the storage area to one corresponding to a difference between the reading scale factor set by the first setting portion and a reading scale factor corresponding to the moving speed of the scanner; and an image forming portion configured to form an image on the image formed medium on the basis of the image data having its scale factor changed by the processor.

5. A method of forming an image, comprising:

reading an image from a document as line-like reflected light traveling in a main scanning direction by a photoelectric converting device;

relatively moving the photoelectric converting device and the image from the document in a sub-scanning direction by a scanner;

setting a reading scale factor for the image from the document;

setting the size of an image formed medium;

determining to which of a plurality of divided ranges the set reading scale factor belongs;

moving the scanner at a specified moving speed corresponding to the determined range, the specified moving speed varying with the ranges;

calculating a distance the scanner moves on the basis of the set reading scale factor and the set size of the image formed medium;

storing the image read by the photoelectric converting device while moving the scanner at the moving speed corresponding to the reading scale factor over the calculated moving distance, in a storage area based on the moving distance and moving speed of the scanner, changing a scale factor of the image data stored in the storage area to one corresponding to a difference between the set reading scale factor and a reading scale factor corresponding to the moving speed of the scanner, and forming an image on the image formed medium on the basis of the image data having its scale factor changed.

6. A method of forming image, comprising:

reading an image from a document as line-like reflected light traveling in a main scanning direction by a photoelectric converting device;

relatively moving the photoelectric converting device and the image from the document in a sub-scanning direction by a scanner;

setting a reading scale factor for the image from the document;

setting the size of an image formed medium;

selecting a second reading speed corresponding to a reading scale factor of 50% when the set reading scale factor is within the range of 25 to 50%, selecting a first reading speed corresponding to a reading scale factor of 100% when the set reading scale factor is within the range of 51 to 100%, and selecting a third reading speed corresponding to a reading scale factor of 200% when the set reading scale factor is within the range of 101 to 400%;

moving the scanner at the selected reading speed;

calculating a distance the scanner moves on the basis of the set reading scale factor and the set size of the image formed medium;

storing the image read by the photoelectric converting device while moving the scanner at the moving speed corresponding to the reading scale factor over the calculated moving distance, in a storage area based on the moving distance and moving speed of the scanner;

changing a scale factor of the image data stored in the storage area to one corresponding to a difference between the set reading scale factor and a reading scale factor corresponding to the moving speed of the scanner; and forming an image on the image formed medium on the basis of the image data having its scale factor changed.

* * * * *